United States Patent [19]

Di Francescantonio

[11] 4,253,700
[45] Mar. 3, 1981

[54] MOTOR VEHICLE WITH TILTABLE CAB

[75] Inventor: Francesco Di Francescantonio, Brescia, Italy

[73] Assignee: Fiat Veicoli Industriali S.p.A., Turin, Italy

[21] Appl. No.: 54,503

[22] Filed: Jul. 3, 1979

[30] Foreign Application Priority Data

Jul. 24, 1978 [IT] Italy .................. 68758 A/78

[51] Int. Cl.³ .............................................. B62D 27/04
[52] U.S. Cl. ................................. 296/190; 180/89.14
[58] Field of Search ................ 296/190; 180/89.13, 180/89.14

[56] References Cited

U.S. PATENT DOCUMENTS

| 2,951,548 | 9/1960 | Crockett | 180/89.14 |
| 3,146,847 | 9/1964 | Rutman | 180/89.14 |
| 3,312,303 | 4/1967 | Milloy | 296/190 |

Primary Examiner—John J. Love
Assistant Examiner—John A. Carroll
Attorney, Agent, or Firm—Sughrue, Rothwell, Mion, Zinn and Macpeak

[57] ABSTRACT

A motor vehicle having a cab which is pivoted frontally to the chassis includes a torsion bar, the reaction moment of which acts through a crank arm and a cam-follower roller on a cam fixed to the base of the cab. The cab is safely and conveniently tiltable since the shape of the cam surface is such that the cab is in neutral equilibrium in any position between its lowered and raised positions.

4 Claims, 5 Drawing Figures

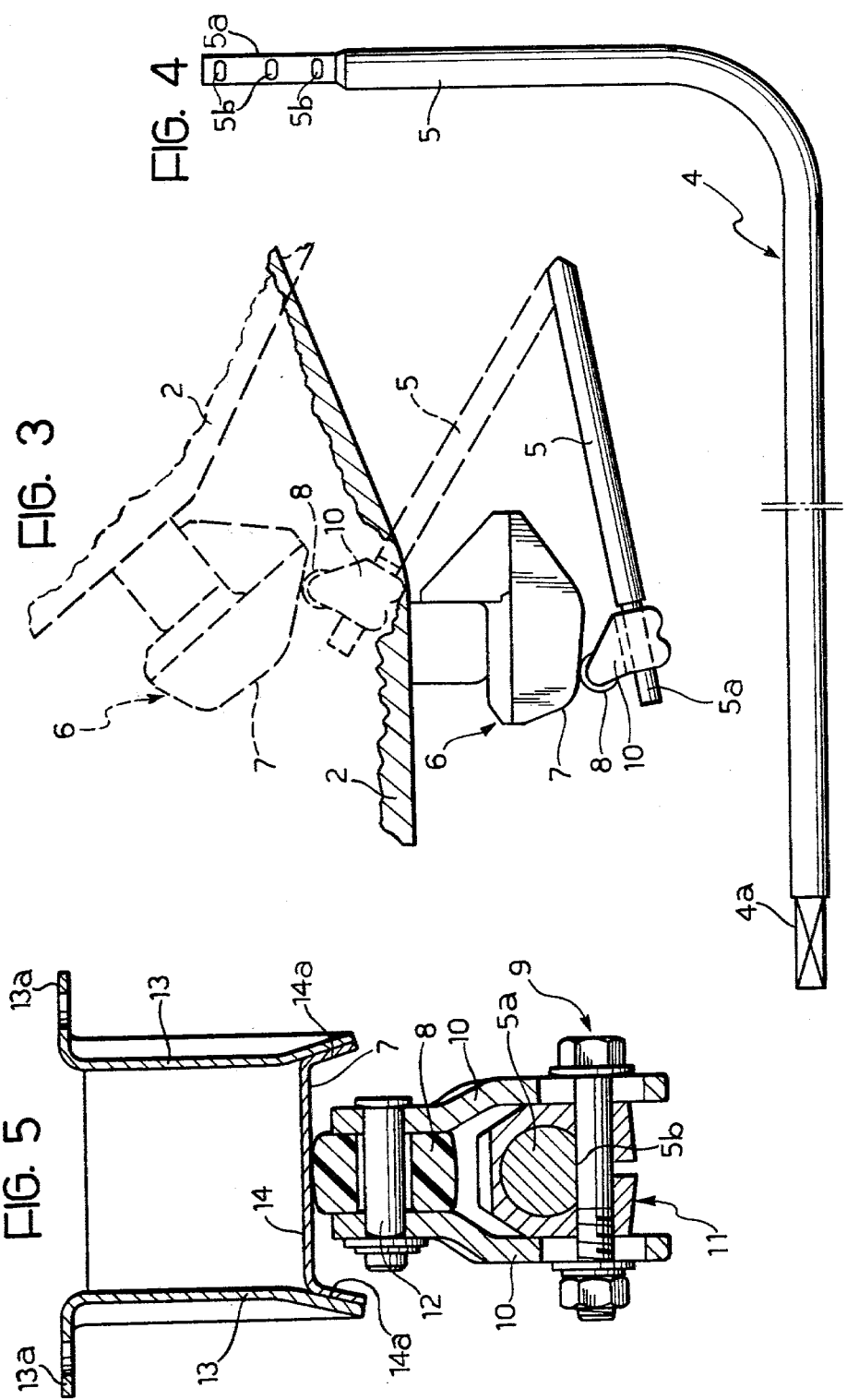

MOTOR VEHICLE WITH TILTABLE CAB

The present invention relates to motor vehicles with cabs which can be tilted forwards for servicing and maintenance access.

The invention is more particularly concerned with a motor vehicle of the type including a chassis and a cab which is mounted at the front of the chassis for selective rotation about a transverse axis between a lowered position and a raised position in such a way that the centre of gravity of the cab remains to the rear of the pivot axis, the vehicle further including at least one torsion bar anchored at one end on the chassis and supported for torsional deformation about a transverse axis, the other end of the torsion bar being provided with a crank arm the free end of which abuts the cab so that the reaction moment of the torsion bar urges the cab towards its raised position, locking means being provided to lock the cab in its lowered position.

The object of the present invention is to provide a motor vehicle of the aforesaid type with a tiltable cab which is safer and more convenient to use than known cabs used previously.

According to the present invention there is provided a motor vehicle of the aforesaid type, characterised in that the free end of the crank arm is maintained in constant abutment with a working surface of a cam mounted on the base of the cab by the reaction moment of the torsion bar, the said cam surface having a profile in a longitudinal vertical plane such that, in said plane, the direction of the common perpendicular to the surface of mutual contact between said free end and said cam surface varies as a function of the variation of the angle of rotation of the said crank arm in such a way that, for any value of said angle of rotation, the force acting between the free end of the crank arm and the cam, due to the reaction moment of the torsion bar, is always substantially equal to the force acting between the cam and the free end of the crank arm due to the weight of the cab.

The motor vehicle according to the invention has a tiltable cab which is for practical purposes in a state of neutral equilibrium at any given value of the angle of rotation of the crank, and, therefore, for any given value of the angle of rotation of the cab about its pivot on the chassis of the vehicle.

One embodiment of the present invention will now be more particularly described, by way of example, with reference to the accompanying drawings, in which:

FIG. 3 is a partly cut-away side view, on an enlarged scale, of a detail of FIG. 2;

FIG. 4 is a side view, on an enlarged scale, of a torsion bar incorporated in the vehicle of FIG. 1, and FIG. 5 is a section taken along the line V—V of FIG. 3.

Figure 1:
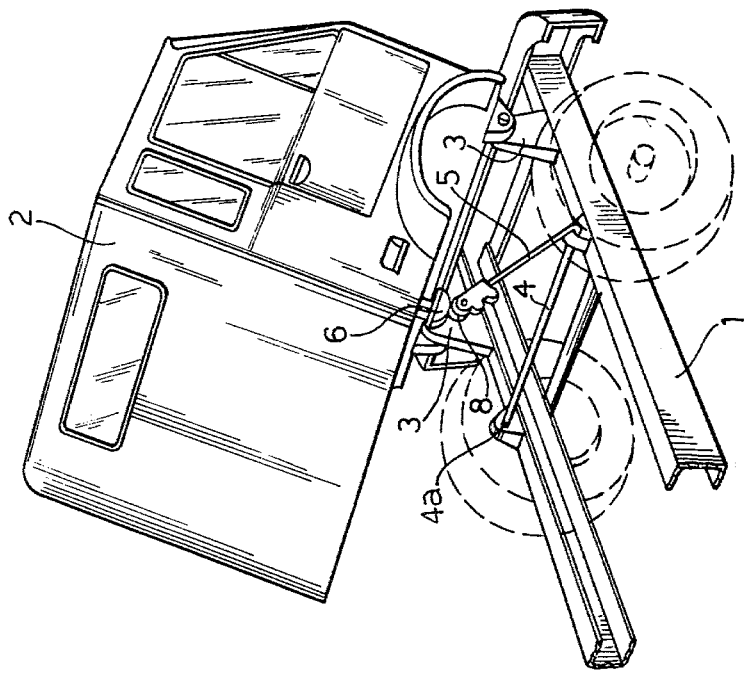
FIG. 1 is a perspective view of the front part of a motor vehicle according to the present invention.

Referring now to FIG. 1, there is shown the front part of a motor vehicle chassis 1 provided with a cab 2. The front end of the cab 2 is mounted on the chassis 1, by a pair of supports 3, for rotation about a transverse axis between a lowered position, in which it is locked during use of the vehicle, and a raised, forwardly tilted position, shown in FIG. 1, which facilitates access to the vehicle engine (not shown) for maintenance. The amount by which the cab 2 can tilt is limited by stop means (not shown).

In the drawings the supports 3 are shown diagrammatically for the purposes of clarity.

A torsion bar 4 is mounted on the chassis 1 for torsional deformation about a transverse axis which is to the rear of the cab supports 3. One end 4a of the torsion bar 4 is anchored to the chassis 1 and the other, free end is provided with a crank arm 5 which abuts a cam 6 mounted on the base of the cab 2 in such a way that the reaction moment of the torsion bar 4 tends to urge the cab 2 from the lowered position to the raised position.

The cam 6 has a working surface 7 which is contacted by a cam-follower roller 8 mounted on the free end of the crank arm 5 for rotation about a transverse axis.

Locking means (not shown) of a known type are provided to lock the cab in its lowered position.

FIG. 3 shows in continuous outline the relative positions of the cam 6 and the crank arm 5 when the cab 2 is in the lowered position, and in ghost outline the relative positions of the cam 6 and the crank arm 5 when the cab 2 is in the raised position.

Referring now to FIGS. 4 and 5, the end 4a of the torsion bar 4 which is adapted to be anchored to the chassis has a square cross-section for positive non-rotational engagement in a socket fitting on the chassis 1. The free end 5a of the crank arm 5 is formed with a plurality of transverse notches 5b for selective engagement by a pair of bolts 9 (FIG. 5) which attach to the crank arm 5 a pair of support plates 10 between which the cam follower roller 8 is rotatably mounted by means of a pin 12. A forked spacer element 11 is interposed between the end 5a of the arms 5 and the support plates 10, the spacer element 11 embracing the free end 5a of the arm 5.

As shown in FIG. 5, the cam 6 is formed by two sheet metal side walls 13, the upper edges of which are formed with respective flanges 13a for the attachment of the cam to the base of the cab 2 and an end wall 14 with two lateral flanges 14a which are welded to the lower edges of the side walls 13. The working surface 7 of the cam 6 comprises the outer surface of the end wall 14.

Figure 2:
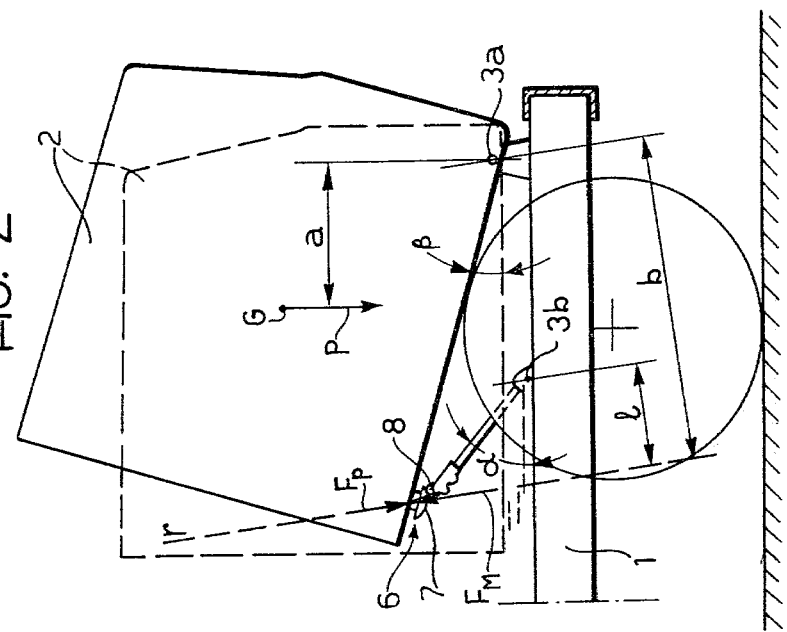
FIG. 2 is a diagrammatic side elevational view of the vehicle of FIG. 1.

Referring now to FIG. 2, there is shown, in ghost outline, the cab 2 in its lowered position, and in continuous outline the cab 2 in its forwardly tilted raised position.

The forces of interaction $F_P$, $F_M$ between the cam 6 and the roller 8 always act in a vertical longitudinal plane along a common perpendicular r which varies the angle of rotation $\beta$ of the cab 2 about its pivot axis 3a. The force $F_P$ which acts between the cam 6 and the roller 8, is due to the weight P of the cab 2, and is equal to the weight P of the cab multiplied by the ratio of the distance a between a line through the pivot axis 3a and a line through the centre of gravity G ot the cab; and the distance b between the line through the pivot axis 3a and the perpendicular r. The force $F_M$ acts between the roller 8 and the cam 6, being due to the reaction moment of the torsion bar 4, and is equal to the reaction moment divided by the distance l, between the deformation axis 3b of the torsion bar and the perpendicular r. The reaction moment of the torsion bar 4 about its pivot axis 3b is dependent, at a given torsional rigidity of the bar, on the angle of rotation $\alpha$ of the crank arm 5.

It will be understood that, in FIG. 2, the angles of rotation $\alpha$, $\beta$ are indicated relative to a horizontal reference line.

It will be appreciated that, since the distances a and b vary with the angles of rotation $\alpha$, $\beta$ (the latter varying as a function of $\alpha$), the force $F_P$ varies with the position of the cab 2. The shape of the cam surface 7, however, maintains a constant relationship between r and the angle $\alpha$ and, since the direction of the perpendicular r varies as a function of the variation of $\alpha$, ensures that the forces $F_P$, $F_M$ are substantially equal in any position of the cab 2.

In this way, the cab 2 is always in a position of neutral equilibrium, since the centre of gravity of the cab 2 is maintained in a position to the rear of pivot axis 3a of the cab on the chassis 1.

Before riasing the cab 2 it is necessary, of course, to release the locking means which lock the cab in its lowered position.

The motor vehicle according to the present invention is provided with a tiltable cab which is safer and more convenient to operate than prior cabs, since the cam 6 allows the cab 2 to remain for practical purposes in neutral equilibrium at any position between its lowered and raised positions.

I claim:

1. In a motor vehicle including:
    a chassis;
    a cab mounted at the front of said chassis for selective rotation about a transverse axis between a lowered position and a raised position in such a way that the centre of gravity of said cab remains to the rear of said pivot axis;
    a torsion bar anchored at one end on said chassis and supported for torsional deformation about a transverse axis;
    a crank arm, attached to the other end of said torsion bar, the free end of said crank arm abutting said cab so that the reaction moment of said torsion bar urges said cab towards its raised position, and
    locking means to lock said cab in its lowered position,
    wherein the improvement consists in said cab including a cam having a working surface with which said free end of said crank arm is maintained in constant abutment by said reaction moment of said torsion bar, said cam surface having a profile in a longitudinal vertical plane, whereby the direction of the common perpendicular, in said plane, to the surface of mutual contact between said free end and said cam surface varies as a function of the variation of the angle of rotation of said crank arm so that, for any value of said angle of rotation, the force acting between said free end of said crank arm and said cam due to said reaction moment of said torsion bar, is always substantially equal to the force acting between said cam and said free end of said crank arm due to the weight of said cab.

2. A motor vehicle as defined in claim 1, wherein said free end of said crank arm supports a cam-follower roller for rotation about a transverse axis, said roller cooperating with said cam surface to reduce the friction between said free end of said crank arm and said cam surface.

3. A motor vehicle as defined in claim 2, wherein said free end of said crank arm is provided with a plurality of transverse notches each adapted to receive the shank of a bolt which secures said roller to said free end by means of a pair of support plates.

4. A motor vehicle as defined in claim 1, wherein said cam comprises two lateral sheet metal walls, the upper edges of which form respective flanges adapted for connection to the base of said cab, and an end wall with lateral edges forming respective flanges which are welded to the lower edges of said lateral walls, the lower surface of said end wall forming said cam surface.

* * * * *